Sept. 21, 1943.  E. D. WATERS  2,330,097
REFLECTING UNIT
Filed March 29, 1941  2 Sheets-Sheet 1

INVENTOR
Eugene D. Waters
BY
Parker, Prockurs & Farmer.
ATTORNEYS

Sept. 21, 1943.     E. D. WATERS     2,330,097
REFLECTING UNIT
Filed March 29, 1941     2 Sheets-Sheet 2
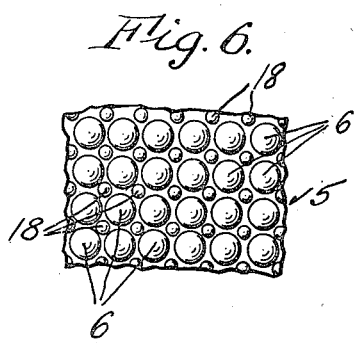
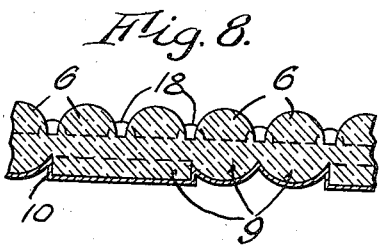
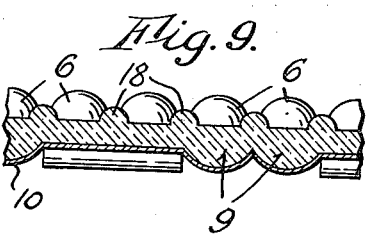
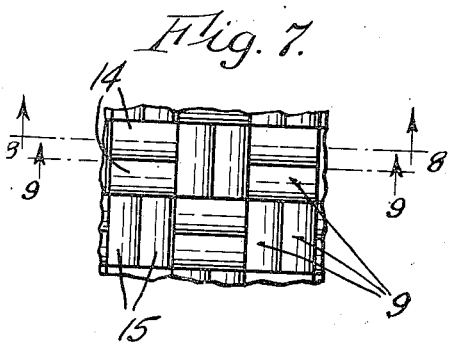
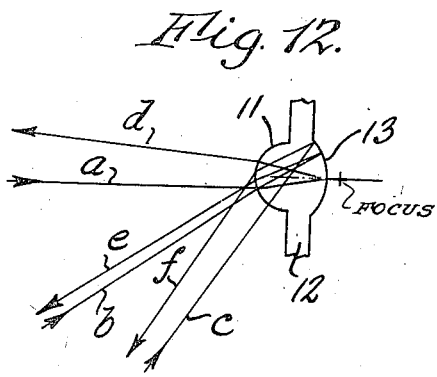
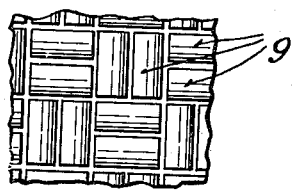
INVENTOR
Eugene D. Waters
BY
Parker, Rockwood & Farmer,
ATTORNEYS Patented Sept. 21, 1943

2,330,097

UNITED STATES PATENT OFFICE 2,330,097

REFLECTING UNIT

Eugene D. Waters, Buffalo, N. Y., assignor, by direct and mesne assignments, to Max D. Farmer, East Aurora, N. Y., as trustee Application March 29, 1941, Serial No. 385,905

14 Claims. (Cl. 88—82)

This invention relates to reflecting optical units for use in signs and as boundary and hazard markers and particularly for use in indicating the boundaries of landing areas and of highways and runways of aircraft landing fields. This application is also in part a continuation of my copending application Serial No. 338,968, filed June 5, 1940.

An object of this invention is to provide an improved type of reflecting unit for such use.

Another object of this invention is to provide a reflecting unit which will reflect incident light from a wide variety of angles back generally towards its source, which will be more readily visible from selected directions than from other directions, and which will be simple and inexpensive to manufacture.

A further object is to provide an improved light reflecting unit which will be particularly useful for indicating hazards and the limits of selected areas such as highways, runways for aircraft in taxiing, landing and taking off, and for seaplane landing areas, with which the same face may be used to indicate boundary limits when approached from opposite directions, and which will have its greatest capacity for reflecting incident light rays back generally towards their source from certain directions and minor capacity for such reflection from all other directions.

Other objects and advantages will be apparent from the following description of a few embodiments of my invention and the novel features will be particularly pointed out hereinafter in connection with the appended claims.

In the drawings:

Fig. 6 is an elevation of the light incident face of a part of another reflecting unit constructed in accordance with this invention;

Fig. 7 is an elevation showing a portion of the rear face of the unit shown in Fig. 6.

Fig. 8 is a sectional plan of an optical unit taken approximately along the line 8—8, Fig. 7;

Fig. 9 is a somewhat similar sectional plan taken approximately along the line 9—9, Fig. 7;

Fig. 10 is a transverse section through a portion of a separate reflecting member which may be employed in Figs. 3 to 9, instead of a silvered reflecting coating applied directly to the transparent coating of the optical unit;

Fig. 11 is a rear face elevation of a light reflecting element somewhat similar to Fig. 7, but illustrating a slight modification thereof; and Fig. 12 is a diagram indicating the light reflecting action of a local zone of the light reflecting element of Figs. 3–11.

Figure 1:
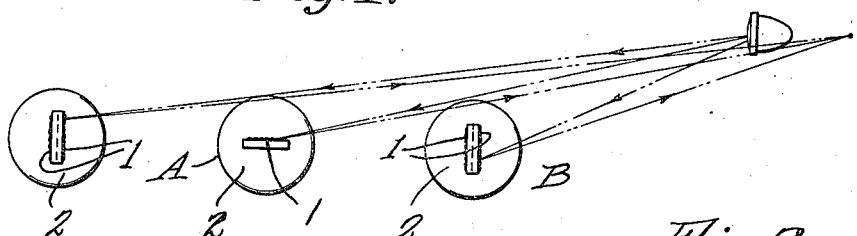
Fig. 1 is a diagram illustrating the manner in which light rays incident upon an optical unit embodying the invention are reflected back generally towards their source.
Figure 2:
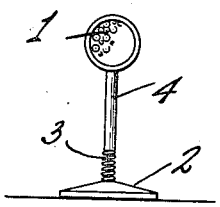
Fig. 2 is a side elevation of a reflecting unit and a mounting device therefor.

In the embodiment of the invention shown in Figs. 1 and 2, an optical unit or reflector constructed in accordance with this invention is mounted in a suitable device, which comprises a base 2, a spring support 3 secured to said base, and a rod 4, in turn supported at one end by said spring and secured at its other end to the reflecting unit 1. The reflector 1 is thus yieldingly supported in its upright reflecting position, but if struck by a vehicle or subjected to any other excessive forces, the mounting means will bend at the spring 3 so as to permit the rod 4 and the reflector 1 to be inclined downwardly, out of the way of the passing vehicle, without extensive damage thereto. Other types of supports may be used.

Figure 3:
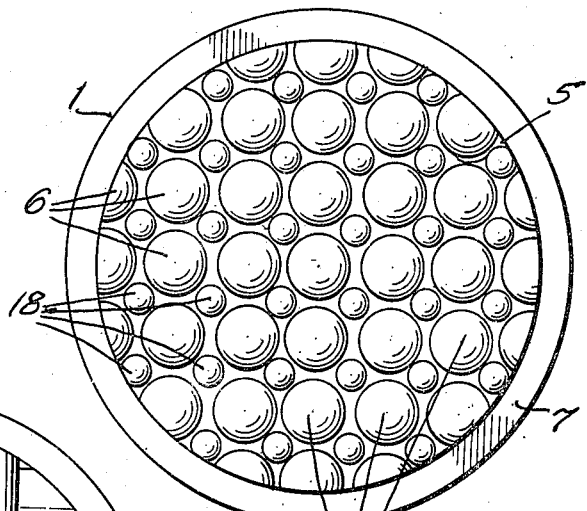
Fig. 3 is an elevation of the light incident face of a reflecting unit constructed in accordance with this invention.

The body of the reflecting element 1 is made of a light transmitting material having preferably a relatively high index of refraction, such as glass having an index of refraction above 1.52. A glass having an index of refraction of 1.523 or higher gives excellent results and can be used advantageously for reflecting light rays at relatively small angles of incidence with respect to the general plane of the light incident face of the unit. Other materials, however, such as transparent or light transmitting plastics or various types of quartz or other glass-like substances might be used, but where the index of refraction of the material is relatively low, the unit usually should be disposed with its front face as nearly as possible normal to the incident rays. The reflecting unit is generally plate-like in shape and comprises a body of such light-transmitting and refracting material 5, (Figs. 3–9), having on its light incident surface a plurality of arcuate convex mounds 6, usually symmetrically arranged in rows, as shown in Fig. 3, and preferably comprising the outside segments of spheres. In the embodiment of the invention shown in Figs. 3–5, the element has a rim 7 along its outer periphery with a flat face on its light incident side as well as its rear side by which the unit may be suitably supported, such as in the standard previously described. The arcuate mounds are generally hemispherical in shape and are ordinarily an integral part of the body 5, but it will be understood that such mounds might be separately affixed to a similar body, as by Canada balsam or other optical cements, for example, without in any way changing the principle of operation of this invention. The rear face 8 of the body 5 is somewhat undulatory in shape, and those undulations are shown in the form of convex cylindrical segments 9. In the embodiment illustrated in Fig. 4, three cylindrical segments 5a are arranged side by side in a square with their longitudinal axes parallel to one another and extending generally parallel to the general plane of the light incident face of the unit. Adjacent cylindrical segments 5b directly above and below, and on either side of the square thus formed, are similar to the segments 5a but have their longitudinal axes extending in directions generally crosswise of the parallel axes of the three central segments 5a. The remainder of the rear surface is formed of additional and similar but if desired somewhat smaller segments with their longitudinal axes preferably parallel to said axes of the three central segments.

Each of these cylindrical segments is usually so disposed that it lies directly opposite and behind one or more of the relatively large arcuate mounds 6 for purposes which will appear presently, and conversely, each of the mounds 6 lies directly over and is alined with one of the cylindrical segments comprising the rear face of the optical unit. The radius of curvature of the cylindrical segments 9 is in general substantially greater than the radius of curvature of the arcuate mounds 6.

Disposed adjacent to the rear face of the reflector is a layer of any suitable light reflecting medium 10, such as tinfoil or a silver coating, which will reflect substantially all of the light incident thereon. This layer of reflecting material 10 has a shape which preferably generally conforms to the shape of the rear face of the reflector body and usually it will be disposed or mounted in direct contact with the rear face of that body.

Figure 4:
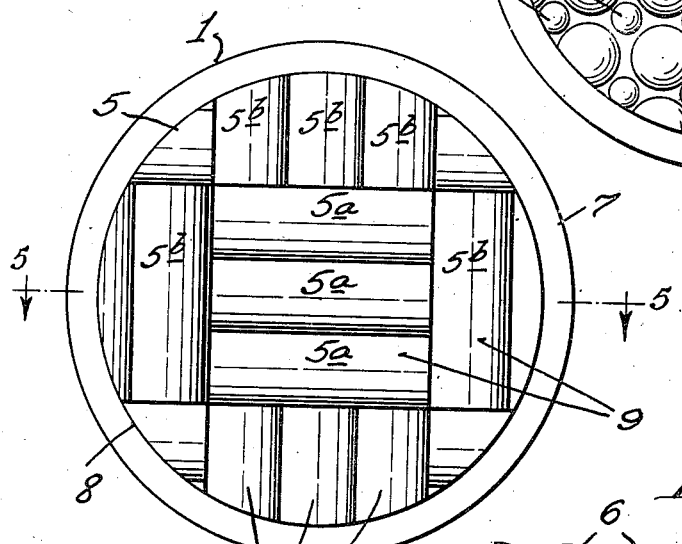
Fig. 4 is an elevation of the rear face of the unit shown in Fig. 3.
Figure 5:
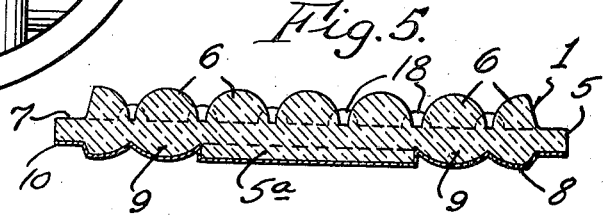
Fig. 5 is a sectional plan of a reflecting unit taken approximately along the line 5—5, Fig. 4.

The action of a reflector thus constructed in accordance with this invention is illustrated somewhat diagrammatically in Fig. 12, in which typical light rays a, b and c are incident upon a mound 11 similar to the mound 6 in Figs. 3-5. The rays are refracted upon entering the mound, pass through the body of light transmitting and refracting material 12 similar to the body 5, and are finally reflected by the cylindrical surface of the reflecting material or medium 13, upon which the refracted ray is incident. The reflected rays pass back once again through the body of the reflecting unit, and upon leaving the mound 11, are refracted back generally towards their source. In the Fig. 12 diagram, the incident ray a becomes the reflected ray d, the ray b is reflected as the ray e, and the ray c is reflected as ray f.

One will observe that the ray c is incident upon the reflector at a relatively small angle, but the ray is nevertheless returned or reflected back in the general direction from which it came. Similarly, the rays a and b are reflected back generally towards their sources.

In the use of reflectors of this type, the point of observation is seldom identical with or close to the source of light and, therefore, it is usually not desirable to have the reflected ray return exactly to the source. Irregularities in the surfaces of the front and rear reflector faces will produce some divergence of the incident and reflected rays. Further deviation between the incident and reflected rays may be controlled by the position of the focus of the sphere-shaped mound of light incident surface with respect to the reflecting surface. Desirable divergence can be obtained by disposing the focus of the convex light incident surface 11 (Fig. 12) in the rear of the reflecting surface 13, or in other words by placing the reflecting surface 13 between the focus and the surface 11. By varying the distance between the focus and the reflecting surface 13, the degree of divergence between an incident ray and its reflected ray may be regulated.

With a reflecting surface of the shape of a cylindrical segment, that is, shaped like a portion of the surface of a cylinder, the light will be reflected back in the same general direction as the incident ray only when the ray lies in a plane crosswise of the longitudinal axis of the cylindrical surface. When using a cylindrical surface as the reflecting surface, there will be maximum intensity of reflection of an incident ray in a plane normal to the longitudinal elements of the surface throughout a wide angle of approach, so long as the rays remain substantially in a plane normal to the longitudinal elements of the reflecting cylindrical surface at the point of incidence. This provides greater intensity of reflection of light within such limits than would be possible if the reflecting surface were a portion of a spherical surface.

By varying the patterns of the cylindrical segments and by rotating the reflecting unit about its axis into or disposing it in, various angular positions, it is possible to mount the reflecting unit so that it will be more readily visible by reflected light from one direction than from another. For example, the reflecting surface might consist entirely or almost entirely of cylindrical segments having vertical longitudinal axes, in which event the reflector would be readily visible with considerable relative intensity from any of a plurality of generally horizontal directions, but would not be so visible from points at levels substantially above or below it. If one wished to make such a marker more visible from different vertical levels, he would merely have to move the reflecting unit through an angle of 90 degrees so that the reflector would operate effectively to reflect light rays in a plane generally perpendicular to the longitudinal axes of the cylindrical segments which would now be horizontal. In lieu of having a major part or all of the reflecting surface formed of cylindrical segments having parallel axes, one may arrange the segments in any desired order to give any desired effect, or with greater intensity of reflection from one selected direction than from another. Any arrangement of the segments for making the reflecting unit visible to selected extents from different directions might thus conceivably be made, all, however, being based on the general principle that a given cylindrical surface will operate most effectively to reflect incident light rays when such rays are generally in planes perpendicular to the longitudinal axis of the surface of a reflecting cylindrical segment.

Reflecting units herein described are of particular value, for example, in marking the hazards or boundaries of military air fields. It is often desirable that the reflecting markers be readily visible to a pilot who is landing an airplane, but that they be concealed from hostile aircraft flying overhead, and for this purpose, the unit has more of its cylinder shaped segments with vertical longitudinal axes than with horizontal axes to render the markers more easily visible to an approaching aircraft at more or less the same level as the markers than to pilots of planes flying overhead who look down from above such units.

Reflectors constructed in accordance with this invention will also be useful in advertising signs, to indicate road boundaries and in a variety of other applications in which considerable intensity of reflection is desired in a given direction, or in which it is desirable that a substantial amount of light incident at a relatively small angle be reflected back generally towards the source.

In Figs. 6, 7, 8, and 9, another embodiment of the invention is shown and in these figures the same reference characters used in Figs. 3 to 5 have been used to designate similar elements of the reflector. The reflecting cylindrical segments are arranged in pairs adjacent one another, each segment in the example shown being twice as long as it is wide and each pair of adjacent cylindrical surfaces having parallel axes and being disposed in checkerboard fashion adjacent another pair having axes perpendicular to the parallel axes of the first pair. For example, in Fig. 7, the pair of segments 14 with horizontally extending longitudinal axes are disposed adjacent the pair of segments 15 having vertical axes. Such a reflecting unit will efficiently reflect a variety of incident rays in a plane generally perpendicular to either the vertically or the horizontally extending segments.

In Fig. 10, another embodiment of the invention is illustrated, in which the reflecting medium is a plate separate from the main body 5 and which retains its shape in handling. It will be understood, however, that this separate plate or body 16 with its reflecting surface 17 is placed directly behind the body 5, whatever the character of the rear face of the body, but in the preferred example shown, the undulations on the reflector fit the undulations on the rear face of the body 5.

In Fig. 11, another modification is shown, in which the cylindrical segments of the rear surface of the body, the optical unit, and also the reflecting surfaces of the reflecting medium conforming thereto, are separated slightly by flat surfaces or area strips generally parallel to the plane of the whole unit. An advantage of such a unit is that it is easier to mold a body having an undulatory surface with fairly wide strips between the cylindrical segments than a surface in which the curved surfaces directly abut one another.

In order to break up the substantially flat areas between the relatively large hemispherical mounds, Figs. 3 and 6, which would tend to reflect light like a plain surfaced mirror, the element is provided on its light incident face with a plurality of small mounds or bosses 18 which are disposed in the spaces between the larger hemispherical mounds 6. Such irregularities in the incident surface of the unit prevent a mirror-like reflection from a substantial area of the unit, and by making them of convex mounds, they aid in refracting incident light to the reflecting surface, which increases the effectiveness of the unit.

Referring now to Fig. 1, it will be observed that optical units constructed in accordance with this invention may be used in a variety of ways, such as to mark hazards adjacent to, or the boundary of, a landing area, for example. While the unit has been shown as applied to markers, it will be understood that it may also be used in advertising and other signs. The reflector device designated "A" has a single reflector 1 with a light incident face generally parallel to the direction of approach of landing aircraft, and with many reflecting segments on the rear face disposed with their longitudinal axes upright. Such a reflector will be readily visible by reflected light from directions either to the right or to the left of the Fig. 1 position. Another method of mounting the reflecting units is shown in the device marked "B," in which a pair of reflecting units 1 are disposed back to back, facing in opposite directions. This device is placed on the margin of an aircraft landing runway with the light incident faces generally perpendicular to the direction of travel along the runway, and will be visible to aircraft approaching from either direction along the runway.

It will be understood that various changes in the details, materials and arrangements of parts, which have been herein described and illustrated in order to explain the nature of the invention, may be made by those skilled in the art within the principle and scope of the invention as expressed in the appended claims.

I claim as my invention:

1. An optical unit of the reflecting type, comprising a body of light transmitting and refracting material having formed on its light incident face a plurality of convex, arcuate mounds, and on its rear face short mounds of cylindrical segments arranged side by side and having their longitudinal axes extending at a plurality of different angles to one another, a light reflecting medium abutting and approximately conforming to said cylindrical segment mounds to reflect back through said body, light rays that are incident on said convex, arcuate mounds and are refracted thereby to said reflecting medium at said cylindrical segment mounds.

2. An optical unit of the reflecting type, comprising a body of light transmitting and refracting material having formed on its light incident face a plurality of convex, arcuate mounds, a light reflecting medium disposed at the opposite face of said body and reflecting back through said body, light rays that are incident on said convex mounds and are refracted thereby to said reflecting medium, said reflecting medium having an undulatory concave surface in which the undulations approximate in shape, short segments of cylinders approximately adjoining one another with their longitudinal axes arranged at a plurality of different angles to one another.

3. An optical unit of the reflecting type, comprising a body of light transmitting and refracting material having formed on its light incident face a plurality of convex, arcuate mounds, representing outside segments of spheres and on its rear face short mounds of cylindrical segments arranged side by side, directly opposite the spherical mounds, and having their longitudinal axes extending at a plurality of different angles to one another, a light reflecting medium abutting and approximately conforming to said cylindrical segment mounds to reflect back through said body, light rays that are incident on said convex, arcuate mounds and are refracted thereby to said reflecting medium at said cylindrical segment mounds, said reflecting medium being disposed a material distance in front of the focus of incident light rays refracted by the body and mound immediately in front thereof, whereby the light rays reflected by said medium back through said body will leave said body in a direction which is non-parallel to the corresponding ray incident on said body.

4. An optical unit of the reflecting type, comprising a body of light transmitting and refracting material having formed on its light incident face a plurality of convex, arcuate mounds, representing outside segments of spheres a light reflecting medium disposed at the opposite face of said body and reflecting back through said body, light rays that are incident on said convex mounds and are refracted thereby to said reflecting medium, said reflecting medium having an undulatory concave surface in which the undulations approximate in shape, short segments of cylinders approximately adjoining one another with their longitudinal axes arranged at a plurality of different angles to one another, said reflecting medium being disposed a material distance in front of the focus of incident light rays refracted by the body and mounted immediately in front thereof, whereby the light rays reflected by said medium back through said body will leave said body in a direction which is non-parallel to the corresponding ray incident on said body.

5. An optical unit of the reflecting type, comprising a body of light transmitting and refracting material having on its light incident face a plurality of convex mounds of approximately segmental sphere shape and also of light transmitting and refracting material, a light reflecting medium disposed adjacent the opposite face of said body for reflecting back through the body rays of incident light refracted to said medium by said mounds, said medium having its reflecting surface in the form of short, concave, cylindrical segments disposed directly opposite from said mounds, said segments being disposed with their longitudinal axes extending in a plurality of different directions approximately parallel to the plane representing the general plane of the front face of said body.

6. An optical unit of the reflecting type, comprising a body of light transmitting and refracting material having on its light incident face a plurality of convex mounds of approximately segmental sphere shape and also of light transmitting and refracting material, a light reflecting medium disposed adjacent the opposite face of said body for reflecting back through the body rays of incident light refracted to said medium by said mounds, said medium having its reflecting surface in the form of short, concave, cylindrical segments disposed opposite from said mounds, said segments being disposed with their longitudinal axes extending in a plurality of different directions approximately parallel to the plane representing the general plane of the front face of said body, said mounds comprising one group of relatively large mounds disposed closely to one another in rows, and another group of relatively smaller mounds disposed in and approximately filling the spaces between the mounds of said one group.

7. An optical unit of the reflecting type, comprising a body of light transmitting and refracting material having on its light incident face a plurality of convex mounds of approximately outside segmental sphere shape and also of light transmitting and refracting material, a light reflecting medium disposed adjacent the opposite face of said body for reflecting back through the body rays of incident light refracted to said medium by said mounds, said medium having its reflecting surface in the form of short, concave, cylindrical segments disposed directly opposite from said mounds, one group of said segments being disposed with their longitudinal axes approximately parallel to one another, the remainder of said segments having approximately parallel axes extending in a direction generally crosswise of the axes of said one group, and all of said axes being approximately parallel to the general plane of the front face of said body.

8. An optical unit of the reflecting type, comprising a body of light transmitting and refracting material having on its light incident face a plurality of convex mounds of approximately outside segmental sphere shape and also of light transmitting and refracting material, a light reflecting medium disposed adjacent the opposite face of said body for reflecting back through the body rays of incident light refracted to said medium by said mounds, said medium having its reflecting surface in the form of short, concave, cylindrical segments disposed directly opposite from said mounds, one group of said segments being disposed with their longitudinal axes approximately parallel to one another, the remainder of said segments having approximately parallel axes extending in a direction generally crosswise of the axes of said one group, all of said axes being approximately parallel to the general plane of the front face of said body, the aggregate reflecting surface area of said segments constituting said one group being substantially larger than the aggregate reflecting surface area of the remainder of said segments, whereby said unit will be more easily visible from directions generally perpendicular to the axes of said one group, than from directions parallel to the axes of said one group.

9. An optical unit of the reflecting type, comprising a body of light transmitting and refracting material having on its light incident face a plurality of convex mounds of approximately segmental sphere shape and also of light transmitting and refracting material, a light reflecting medium disposed adjacent the opposite face of said body for reflecting back through the body rays of incident light refracted to said medium by said mounds, said medium having its reflecting surface in the form of short, concave, cylindrical segments disposed directly opposite from said mounds, one group of said segments being disposed with their longitudinal axes approximately parallel to one another, the remainder of said segments having approximately parallel axes extending in a direction generally crosswise of the axes of said one group, all of said axes being approximately parallel to the general plane of the front face of said body, said one group of cylindrical segments being disposed to render said unit more readily visible from directions generally perpendicular to the axes of said group.

10. An optical unit of the reflecting type, comprising a body of light transmitting and refracting material having on its light incident face a plurality of convex mounds of approximately segmental sphere shape and also of light transmitting and refracting material, a light reflecting medium disposed adjacent the opposite face of said body for reflecting back through the body rays of incident light refracted to said medium by said mounds, said medium having its reflecting surface in the form of short, concave, cylindrical segments disposed directly opposite from said mounds, said segments being disposed with their longitudinal axes extending in a plurality of different directions approximately parallel to the plane representing the general plane of the front face of said body, and a group of said segments comprising a substantial portion of the area of said reflecting surface having approximately parallel axes whereby said reflector will be readily visible from directions generally perpendicular to said parallel axes.

11. An optical unit of the reflecting type, comprising a body of light transmitting and refracting material having on its light incident face a plurality of convex mounds of approximately segmental sphere shape and also of light transmitting and refracting material, a light reflecting medium disposed adjacent the opposite face of said body for reflecting back through the body rays of incident light refracted to said medium by said mounds, said medium having its reflecting surface in the form of short, concave, cylindrical segments disposed directly opposite from said mounds, a central portion of said reflecting surface of substantial area being formed of adjacent segments having generally parallel longitudinal axes, a major portion of the remainder of said surface being formed of segments having longitudinal axes generally crosswise to said parallel axes, and all of said axes extending approximately parallel to the general plane of the front face of said body.

12. An improved optical unit of the reflecting type which comprises a body of light transmitting and reflecting material with a relatively high index of refraction and having on its light incident face an arcuate, convex mound of approximately segmental sphere shape, and a light reflecting medium disposed adjacent the opposite face of said body for reflecting back through said body rays of incident light refracted to said medium by said mound, said medium having its reflecting surface in the form of a concave cylindrical segment disposed directly opposite said mound.

13. An optical unit of the reflecting type comprising a body of light transmitting and refracting material having formed on its light incident face a convex arcuate mound of approximately segmental sphere shape and directly opposite on its opposite face a convex mound in the form of the arcuate surface of a cylindrical segment, a light reflecting medium having a reflecting surface approximately conforming to said cylindrical segment mound to reflect back through said body light rays incident on said spherical mound which are refracted thereby toward said cylindrical mound.

14. An improved optical unit of the reflecting type which comprises a body of light transmitting glass with a relatively high index of refraction, having on its light incident face an arcuate, convex mound of approximately segmental sphere shape, and a light reflecting medium disposed adjacent the opposite face of said body for reflecting back through said body rays of incident light refracted to said medium by said mound, said medium having its reflecting surface in the form of a concave cylindrical segment disposed directly opposite said mound.

EUGENE D. WATERS.